United States Patent [19]

Dittmann et al.

[11] E Re. 30,654

[45] Reissued Jun. 23, 1981

[54] STRIPPER RING FOR A CAPSULE-MAKING MACHINE

[75] Inventors: Larry E. Dittmann, Harrisburg; Wayne L. Millhimes, Hershey; Glenn A. Steinhauer, Harrisburg, all of Pa.

[73] Assignee: AMP Incorporated, Harrisburg, Pa.

[21] Appl. No.: 83,037

[22] Filed: Oct. 9, 1979

Related U.S. Patent Documents

Reissue of:

[64] Patent No.: 4,153,406
Issued: May 8, 1979
Appl. No.: 900,045
Filed: Apr. 25, 1978

[51] Int. Cl.[3] ..... B29C 1/00; B29D 23/00

[52] U.S. Cl. ..... 425/438; 425/93; 425/274; 425/537; 425/556; 425/804

[58] Field of Search ..... 264/334; 425/93, 96, 425/185, 186, 274, 354, 438, 537, 556, 804

[56] References Cited

U.S. PATENT DOCUMENTS

| | | | |
|---|---|---|---|
| 2,671,245 | 3/1954 | Kath | 425/96 |
| 2,760,258 | 8/1956 | Rieger | 29/229 |
| 2,915,327 | 12/1959 | Kreske | 403/371 |
| 3,264,684 | 8/1966 | Moslo | 425/438 |
| 3,817,678 | 6/1974 | Armour | 425/441 |
| 3,929,960 | 12/1975 | Findlay et al. | 264/292 |

*Primary Examiner*—W. E. Hoag
*Attorney, Agent, or Firm*—Allan B. Osborne

[57] ABSTRACT

The present invention relates to a device used in capsule-making machines which, after the gelatin has cured, strips it off the tapered forming pin. More particularly, the device is a plastic ring having a spring metal split ring insert embedded therein along with an external anti-creep spring to maintain proper dimension of the device.

8 Claims, 4 Drawing Figures

STRIPPER RING FOR A CAPSULE-MAKING MACHINE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to those devices which are required on molding machines to strip the molded article from a core pin or the like subsequent to the curing step.

2. The Prior Art

U.S. Pat. No. 3,817,678 discloses a sleeve adapted to strip a finally shaped product from a core pin.

U.S. Pat. No. 3,929,960 includes in its teaching a movable mandrel which holds the formed shotgun shell while the core pin is withdrawn.

The patent to A. W. Koth, U.S. Pat. No. 2,671,245, discloses a device consisting of a pair of jaws adapted to encircle the core pin and push the capsule half off.

SUMMARY OF THE INVENTION

The present invention relates to a stripper ring having a spring metal, split ring insert therein and a anti-creep spring about the ring's periphery.

DESCRIPTION OF THE INVENTION

Figure 1:
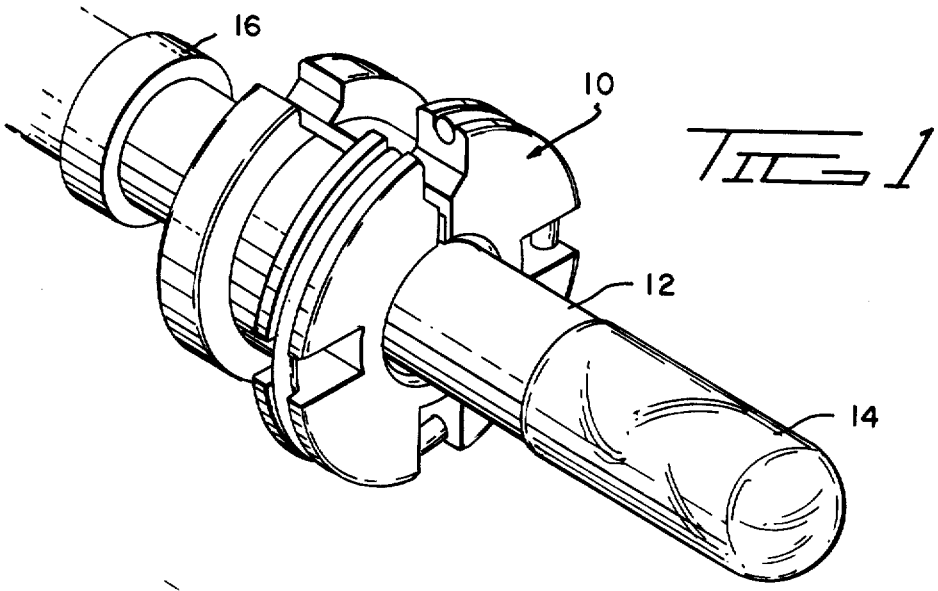
FIG. 1 shows the stripper ring positioned on a core pin.

Reference numeral 10 designates in all the drawings the stripper ring constructed in accordance with the preferred embodiment of the present invention. Reference numeral 12 designates a core pin and reference numeral 14 designates a capsule half formed on the core pin. A stop member 16 is positioned on the core pin behind stripper ring 10.

Figure 2:
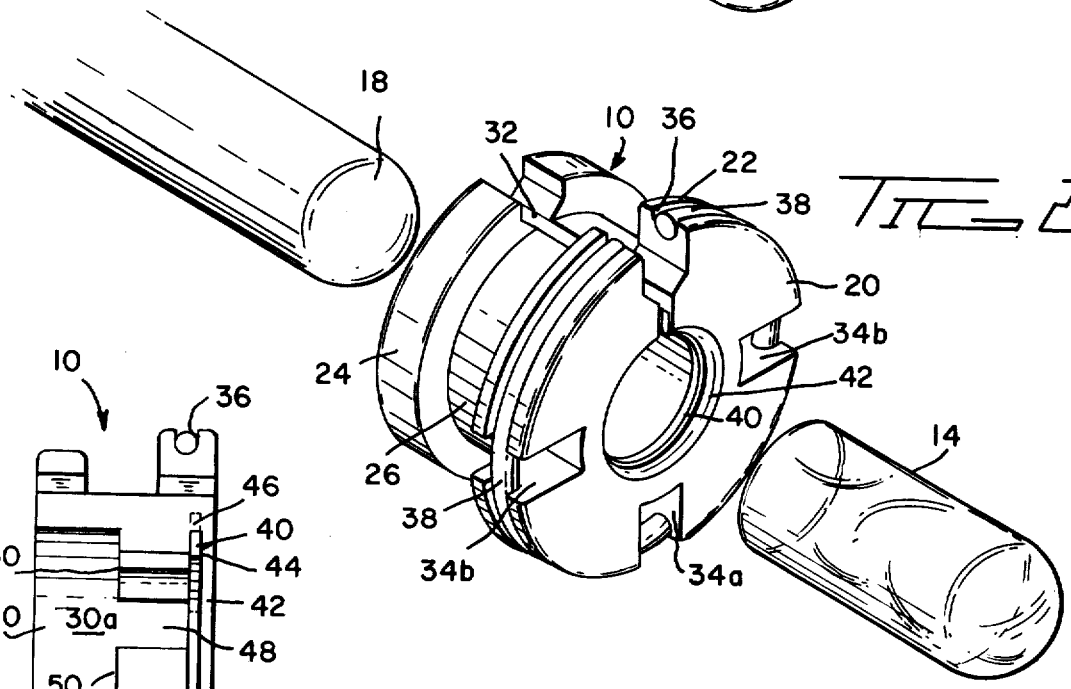
FIG. 2 shows the removal of a capsule half from the core pin by the stripper ring.

Core pin 12 has a taper of twelve thousandths (0.012) per linear inch, the taper being towards its free end 18 (FIG. 2). Core pins used in making capsules are generally of stainless steel.

Capsule half 14 is formed or molded from a digestible gelatin.

In operation, each core pin in a capsule-making machine (not shown) carries with it a stripper ring as shown in FIG. 1. A pin is dipped into a tank of molten gelatin so that a thickness thereof may coat the pin's surface. Upon removing the pin and the new acquired layer of gelatin, curing is induced. Subsequent thereto, the now formed capsule half is removed by moving the stripper ring 10 down the core pin by a ring sliding mechanism (not shown), pushing capsule half 14 off as shown in FIG. 2. (In actual practice the ring does not leave the pin). Thereafter, the stripper ring is returned to stop member 16 where it will remain for about one-half hour until another capsule half is to be removed.

Stripper ring 10 will now be described with reference to all drawings. The ring's exterior surface includes a front face 20, a front flange 22, a rear flange 24, an intermediate groove 26 and a rear face 28. A passageway 30 extends through the ring, opening out onto both faces. A longitudinal slot 32 cuts through one side of the ring to the passageway; thus in reality making it a split ring. A squarish U-shaped notch 34a is positioned along the ring's exterior surface opposite the aforementioned slot. Further, two other notches, 34b, are positioned between the slot and notch 34a. The notches, which do not cut through to the passageway, extend from and intersect both front and rear faces. The depth of the notches is such as to leave a thin web 35 of material between them and the passageway so that in effect the ring is composed of four almost isolated quarters.

Front flange 22 has a groove 36 extending around its perimeter. A steel spring 38 occupies the groove. The spring has a break in it so as not to be continuous.

An annular spring metal split ring insert 40 is embedded in the stripper ring immediately behind the front face 20 and in encircling relation to passageway 30 with the inner surface of the insert being flush with the surface of the passageway. The insert can be slightly seen in FIG. 2; is shown in phantom in FIG. 3; and in a side cross-section in FIG. 4.

Figure 3:
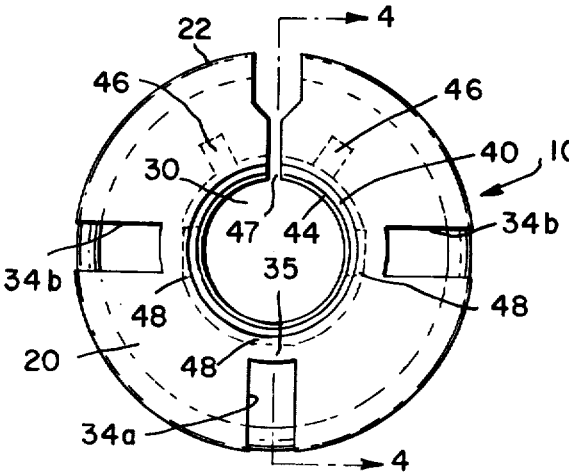
FIG. 3 is a frontal view of the stripper ring.

The opening in the front face to passageway 30 is beveled as indicated by reference numeral 42 in FIGS. 2 and 3. The beveling extends to the insert as indicated by reference numeral 44 in FIGS. 3 and 4.

The insert has two ears 46 which extend laterally outwardly. These ears, which are shown in phantom, in FIG. 3, are spaced one from the other at about 60 degrees on either side of the opening, indicated by reference numeral 47 in FIG. 3. The insert is embedded in the plastic so that the ears are symmetrically positioned from either side of slot 32. The opening in the insert is in registration with the slot.

Preferably the spring metal split ring insert 40 is made from aluminum bronze.

Figure 4:
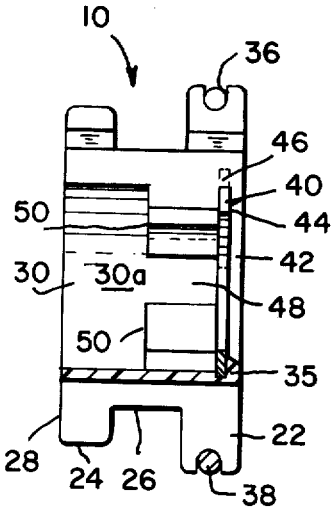
FIG. 4 is a cross-sectional view of the stripper ring taken along lines 4—4 of FIG. 3.

The structure of the interior walls defining passageway 30 can be seen best in FIG. 4. The passageway is composed of two sections, each of a different diameter. The section having the largest diameter extends inwardly about half way from rear face 28. Reference numeral 30a denotes this section. The second, smaller section, indicated generally by reference numeral 30b, is of a diameter equal to the inner diameter of insert 40. This section extends forwardly from section 30a to the insert. Three gaps 48, shown in phantom in FIG. 3, extend through the smaller section from its intersection with the larger section 30a. One gap is on the bottom adjacent web 35. The other two are spaced on either side of the section between the bottom gap and slot 32; i.e., in registration with notches 34b.

The reduced diameter section 30b provides rearwardly facing shoulders 50 (FIG. 4). These shoulders engage the stop member 16 whose outer diameter is just smaller than the diameter of section 30a.

The ring (with the insert) is molded so that the diameter of section 30b of passageway 30 is that of the smallest diameter the ring will see on pin 12.

Stripping rings currently in use are made completely from plastic. As noted above, the stripper ring is positioned back on pin 12 over and abutting stop member 16 during most of the capsule making operation and then, for a brief moment of time, it is slid down the tapered pin to push off the cured capsule half. Its position adjacent the stop member is at the largest diameter of the pin and consequently, the nature of the plastic being what it is, the ring tends to take a set in that expanded condition. Accordingly, as the ring is slid down the tapered pin, the plastic does not want to contract and follow the decreasing diameter. Since this objectionable characteristic becomes more pronounced with time, particularly in the capsule-making environment, the all plastic stripper rings have a very short useful life.

The solution to the short life problem has been solved by the present invention but not without certain difficulties. For example, a capsule-making machine contains hundreds of pins and adjacent each pin is a complex mechanism for sliding the stripper ring up and down the pin. Accordingly, the exterior features of the all plastic prior art stripping ring had to be retained for the most part so as not to obsolete the ring-sliding mechanisms. Other features, particularly the dimensions of the prior art rings, had to be retained also.

The significant change to the exterior surface is the addition of the deep notches 34a and 34b. The notch effectively separates the ring into four independent quarters. Web 35 connecting adjacent quarters is thin enough so that the behavior of one quarter is not transmitted through to the other quarters. A second change made is groove 36 and steel spring 38 positioned therein. As the spring is pre-loaded to exert an inwardly compressing force, it acts to draw the quarters inwardly to reduce the passageway's diameter.

The significant interior changes include the addition of the spring metal, split ring insert 40. The insert acts under expanding and contracting forces as two "arms" pivotally connected at a point diametrically opposed to opening 47; i.e., in registration with notch 34a. This point is a major stress point. There are also minor stress points located on each "arm" between the major stress point and the opening. These minor points are in registration with notches 34b. Obviously the insert can flex more easily with only the thin webs 35 acting as a restraint.

Accompanying the insert are the presences of gaps 48 which cut longitudinally through section 30b. These gaps are positioned to be in alignment with the aforementioned major and minor stress points and also are in alignment with notches 34a and 34b. These gaps cooperate with the notches to isolate each quarter of the ring as noted above so as not to impede the flexing of insert 40 as the stripper ring rides up and down pin 12. The ring segments defined by the notches and gaps eliminate the undesirable property of the plastic as noted above and thus allows the lateral expansion and contraction of the stripper ring to be controlled more precisely; i.e., the lateral movement is a function of the property of the metal insert and not of the plastic.

The ears 46 on the insert provide an anchor for the insert in the plastic.

The foregoing detailed description has been given for clearness of understanding only, and no unnecessary limitations should be understood therefrom, as some modifications will be obvious to those skilled in the art.

What is claimed is:

1. In molding apparatus, for forming a hollow article on a mandrel, and having a slotted stripper ring, with a passageway therethrough, for removing said article from said mandrel, the improvement comprising: a spring metal insert embedded in the ring adjacent the front face thereof with the interior edge defining at least one surface of the passageway extending through the ring.

2. [The improvement of claim 1 further including] *In molding apparatus for forming a hollow article on a mandrel and having a slotted stripper ring reciprocating on the mandrel to strip the formed article therefrom, with the ring being of the type having a spring metal insert embedded therein, the improvement comprising* a pair of ears extending outwardly from said insert with each ear being on one side of and near the slot in the ring.

3. The improvement of claim [1] *8* further including an exterior notch extending along the length of the ring and positioned opposite the slot, the depth of the notch being such as to leave a thin web of material between the halves of the ring defined by said notch.

4. The improvement of claim 3 further including an additional pair of notches, one on each of said halves so that the slot and three notches cooperate to segment the ring into four quarters, the depth of said notches being such so as to leave a thin web of material between the quarter defined by the notches.

5. The improvement of claim 3 further including a interior longitudinal gap in the wall of said passageway, said gap being in registration with the exterior notch and being separated therefrom by said thin web of material.

6. The improvement in claim 4 further including interior, longitudinal gaps in the wall of said passageway, said gaps being in registration with the exterior notches and being separated therefrom by thin webs of material.

7. The improvement of claims 1, 2, 3, 4, 5 or 6 further including a split annular steel spring encircling the ring so as to bias the edges of the slot towards one another.

*8. In molding apparatus, for forming a hollow article on a mandrel, and having a slotted stripper ring, with a passageway therethrough, for removing said article from said mandrel, the improvement comprising: a spring metal insert embedded in the ring adjacent the front face thereof with the interior edge defining at least one surface of the passageway and with a pair of ears extending outwardly from said insert with each ear being on one side of and near the slot in the ring.*

* * * * *